US010229610B2

(12) United States Patent
Blow et al.

(10) Patent No.: US 10,229,610 B2
(45) Date of Patent: Mar. 12, 2019

(54) CONTEXTUAL AWARENESS USING RELATIVE POSITIONS OF MOBILE DEVICES

(75) Inventors: Anthony T. Blow, San Diego, CA (US); Daniel S. Baker, San Diego, CA (US); Roman Tivyan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 13/436,312

(22) Filed: Mar. 30, 2012

(65) Prior Publication Data

US 2013/0260348 A1 Oct. 3, 2013

(51) Int. Cl.
*H04W 4/02* (2018.01)
*H04W 4/21* (2018.01)
*G09B 19/00* (2006.01)

(52) U.S. Cl.
CPC ............ *G09B 19/00* (2013.01); *H04W 4/023* (2013.01); *H04W 4/21* (2018.02)

(58) Field of Classification Search
USPC ................................ 434/236; 455/456.6, 518
See application file for complete search history.

(56) References Cited

U.S. PATENT DOCUMENTS

| | | | |
|---|---|---|---|
| 5,952,959 A | 9/1999 | Norris | |
| 6,542,749 B2 | 4/2003 | Tanaka et al. | |
| 7,076,255 B2 | 7/2006 | Parupudi et al. | |
| 7,773,972 B2 | 8/2010 | Croome et al. | |
| 8,185,135 B2 | 5/2012 | Gupta et al. | |
| 8,185,627 B2 | 5/2012 | Baumert et al. | |
| 8,554,283 B1 * | 10/2013 | Behbehani | H04W 4/02 455/566 |
| 9,264,484 B1 * | 2/2016 | Moxley | H04L 67/10 |
| 9,319,832 B2 * | 4/2016 | Crowley | H04W 4/02 |
| 9,736,638 B2 * | 8/2017 | Khorashadi | G01C 21/206 |
| 2003/0043073 A1 | 3/2003 | Gray et al. | |
| 2005/0136845 A1 | 6/2005 | Masuoka et al. | |

(Continued)

FOREIGN PATENT DOCUMENTS

EP 1436639 B1 6/2007

OTHER PUBLICATIONS

Eagle N. et al., "Reality Mining Sensing Complex Social Systems", Personal and Ubiquitous Computing, Springer Verlag, LO, vol. 10. No. 4. May 1, 2006 (May 1, 2006). pp. 255-268. XP019381413. ISSN: 1617-4917. DOI: 10.1007/S00779-005-0046-3 the whole document.

(Continued)

*Primary Examiner* — Robert J Utama
(74) *Attorney, Agent, or Firm* — Kilpatrick Townsend & Stockton/Qualcomm

(57) ABSTRACT

A server based contextual awareness method of communicating in a wireless network includes detecting a signal strength of one or more user equipments (UEs) relative to other user equipment within a same vicinity. The method also includes detecting a pattern of the user equipment(s) and the other user equipment based on the detected signal strength of the user equipment(s) relative to the other user equipment. The method also includes deriving a social context based on the detected pattern. The method further includes initiating an action in response to the derived social context.

15 Claims, 6 Drawing Sheets

(56) References Cited

U.S. PATENT DOCUMENTS

| | | | |
|---|---|---|---|
| 2006/0107219 | A1 | 5/2006 | Ahya et al. |
| 2007/0052534 | A1* | 3/2007 | Bird .................... G01S 5/0284 340/539.13 |
| 2007/0124721 | A1 | 5/2007 | Cowing et al. |
| 2007/0173236 | A1 | 7/2007 | Vishwanathan et al. |
| 2008/0189354 | A1 | 8/2008 | Narasimhan et al. |
| 2009/0097635 | A1* | 4/2009 | Abuelsaad et al. ...... 379/266.06 |
| 2009/0325598 | A1 | 12/2009 | Guigne et al. |
| 2010/0077484 | A1 | 3/2010 | Paretti et al. |
| 2010/0211695 | A1 | 8/2010 | Steinmetz et al. |
| 2010/0317371 | A1* | 12/2010 | Westerinen et al. ....... 455/456.6 |
| 2010/0332668 | A1 | 12/2010 | Shah et al. |
| 2011/0137997 | A1* | 6/2011 | Stewart ........................ 709/205 |
| 2013/0260348 | A1* | 10/2013 | Blow .................... H04W 4/023 434/236 |
| 2014/0259189 | A1 | 9/2014 | Ramachandran |
| 2015/0019714 | A1* | 1/2015 | Shaashua ............... H04W 4/70 709/224 |
| 2016/0012453 | A1* | 1/2016 | Naqvi ................... H04W 4/029 705/7.29 |
| 2017/0013408 | A1* | 1/2017 | Grzywaczewski ... H04W 4/029 |
| 2017/0134920 | A1* | 5/2017 | Rahnama ............... H04W 4/21 |
| 2018/0109921 | A1* | 4/2018 | Cerchio ................. H04W 4/02 |
| 2018/0172835 | A1* | 6/2018 | Koochew ............... G01S 19/19 |

OTHER PUBLICATIONS

International Search Report and Written Opinion—PCT/US2013/033750—ISA/EPO—dated Jul. 17, 2013.

Krishnamurthy S. et al., "Context-Based Adaptation of Mobile Phones Using Near-Field Communication", Mobile and Ubiquitous Systems—Workshops. 2006. 3rd Annual International Conference on. IEEE PI, Jul. 1, 2006 (Jul. 1, 2006), pp. 1-10. XP031089357. ISBN: 978-0-7803-9791-0 the whole document.

Pu et al., "Indoor Location Tracking using Received Signal Strength Indicator" (2011) (available at http://cdn.intechweb.org/pdfs/13525.pdf), 29 pages.

Jeffrey Vander Stoep, "Design and Implementation of Reliable Localization Algorithms using Received Signal Strength" (2009) (available at http://www2.ee.washington.edu/research/nsl/lmote/vanderstoep_thesis.pdf), 47 pages.

Doganddić et al., "Signal-Strength Based Localization in Wireless Fading Channels" (Nov. 2004)(available at http://lib.dr.iastate.edu/cgi/viewcontent.cgi?article=1004&context=ece_conf), 7 pages.

Belongie et al., "Matching shapes," Eighth IEEE International Conference on Computer Vision (Jul. 2001), 8 pages.

Grauman, "Shape Matching," 2008 (available at http://www.cs.utexas.edu/~grauman/courses/spring2008/slides/ShapeMatching.pdf), 92 pages.

* cited by examiner

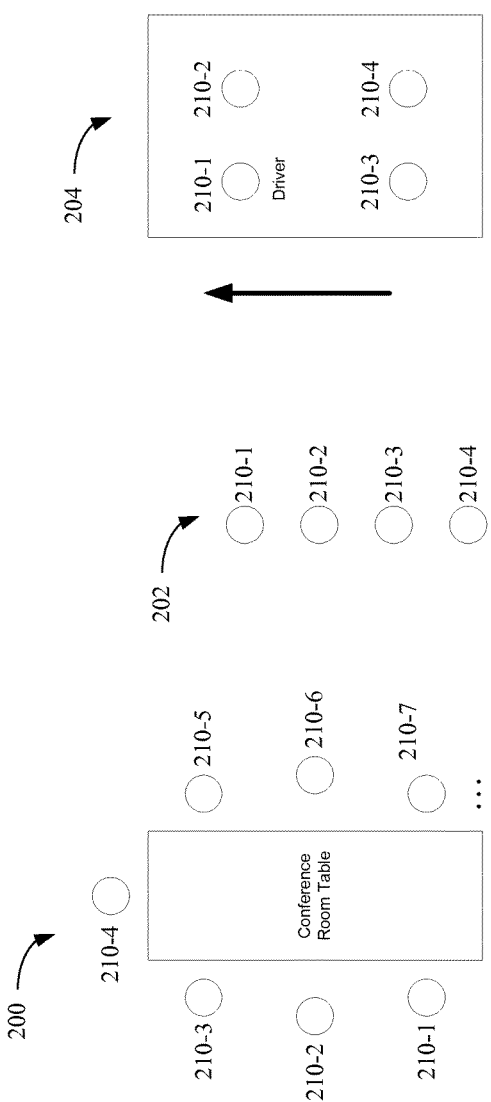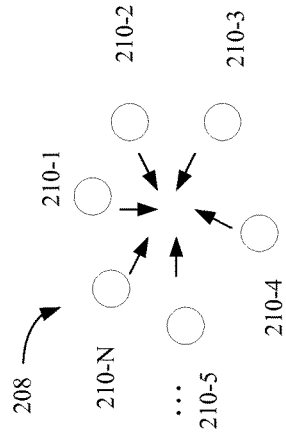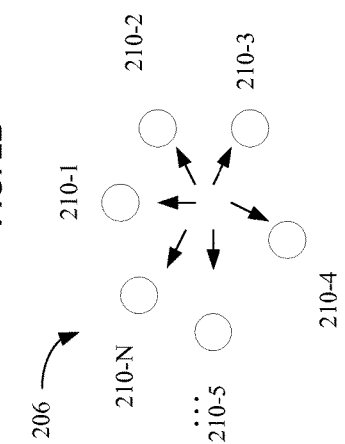

CONTEXTUAL AWARENESS USING RELATIVE POSITIONS OF MOBILE DEVICES

BACKGROUND

Field

Aspects of the present disclosure relate generally to wireless communication systems, and more particularly, to contextual awareness using relative positions of mobile devices.

Background

Numerous systems and methods exist for tracking the location of users. Such tracking may be performed to support context-aware applications, to provide location-based services, or for a variety of other reasons. Tracking of users is often performed by tracking the location of a device or object uniquely associated with the user. For example, numerous mobile devices carried by users today include technology that enables the location of such devices to be determined with varying degrees of accuracy. Such technology may include but is not limited to a Satellite Positioning System (SPS) (e.g., Global Positioning System (GPS) technology), (Wireless Local Area Network)WLAN technology, cellular telephony technology and Bluetooth technology. Information obtained from the mobile devices may include actual location information. For example, the location information may be based on built-in GPS capability, or relative location information, such as proximity to other mobile devices, beacons, or other identifiable objects or locations.

Positioning methods can determine a location of a target device from measurements by the target device of known external signal sources, such as SPS satellites or network base stations. In addition, measurements by network entities (e.g., base stations) of signals from the target device may also help determine the location of the target device. These measurements may enable the determination of a current, absolute location of the target device, for example, its precise latitude, longitude and altitude.

If a target device is unable to measure signals from external sources, and network entities are unable to measure enough signals from the target device, it may not be possible to obtain the location of the target device, and/or to obtain the location within a desired response time. Such cases may occur when there are physical obstructions between the target device and the external signal sources and/or network entities, for example. The inability to measure signals can occur when a target device is inside a building or tunnel, outside in a dense urban environment, or very distant from terrestrial external radio sources and network entities.

SUMMARY

According to one aspect of the present disclosure, a server based contextual awareness method of communicating in a wireless network includes detecting a signal strength of one or more user equipments (UEs) relative to other user equipment within a same vicinity. The method may also include detecting a pattern of the one or more user equipments and the other user equipment based on the detected signal strength of the one or more user equipments relative to the other user equipment. The method may also include deriving a social context based on the detected pattern. The method may further include initiating an action in response to the derived social context.

According to another aspect of the present disclosure, a server based contextual awareness apparatus for communicating in a wireless network includes means for detecting a signal strength of one or more user equipments (UEs) relative to other user equipment within a same vicinity. The apparatus may also include means for detecting a pattern of the one or more user equipments and the other user equipment based on the detected signal strength of the one or more user equipments relative to the other user equipment. The apparatus may also include means for deriving a social context based on the detected pattern. The apparatus may further include means for initiating an action in response to the derived social context.

According to one aspect of the present disclosure, a server based contextual awareness apparatus for communicating in a wireless network includes a memory and one or more processors coupled to the memory. The processor(s) is configured to detect a signal strength of one or more user equipments (UEs) relative to other user equipment within a same vicinity. The processor(s) is further configured to detect a pattern of the one or more user equipments and the other user equipment based on the detected signal strength. The processor(s) is further configured to derive a social context based on the detected pattern. The processor(s) is further configured to initiate an activity in response to the derived social context.

According to another aspect of the present disclosure, a computer program product for wireless communications in a wireless network includes a computer-readable medium having non-transitory program code recorded thereon. The program code includes program code to detect a signal strength of one or more user equipments (UEs) relative to other user equipment within a same vicinity. The program code also includes program code to detect a pattern of the one or more user equipments and the other user equipment based on the detected signal strength. The program code also includes program code to derive a social context based on the detected pattern. The program code also includes program code to initiate an activity in response to the derived social context.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 2A-2E illustrate sample patterns of user equipment representing a group of users gathered together for an event according to some aspects of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art however, that these concepts may be practiced without these specific details. In some instances, well-known structures and components are shown in block diagram form to avoid obscuring such concepts.

In some aspects of the disclosure, a contextually aware user equipment (UE), mobile device, or cell phone for leveraging collected data or information to improve an overall user experience is described. Improvement in the accuracy of Satellite Positioning Systems (GPS) and indoor positioning systems enable the user equipment to draw some conclusions on what a user may be doing, based on a location of those around the user.

The user equipment is contextually aware based on what processing the user equipment is performing and the surrounding situation. For example, some aspects of the disclosure allow for the determination of a user equipment location relative to other user equipment within a close proximity environment. Some examples of a close proximity environment may include a room, a vehicle, a classroom, an outdoor gathering, or the like. Based on the relative positions or locations of the user equipment, a pattern is detected and a social context is derived based on the detected pattern. Deriving a social context may include drawing a conclusion about the current activity of a user associated with the user equipment. An action can be initiated in response to detecting the social context or activity of the user of the user equipment. For example, if the user equipment is operating in a classroom, the user equipment (or a server associated with the user equipment) may generate information to suggest switching the user equipment to a vibrate mode.

Figure 1:
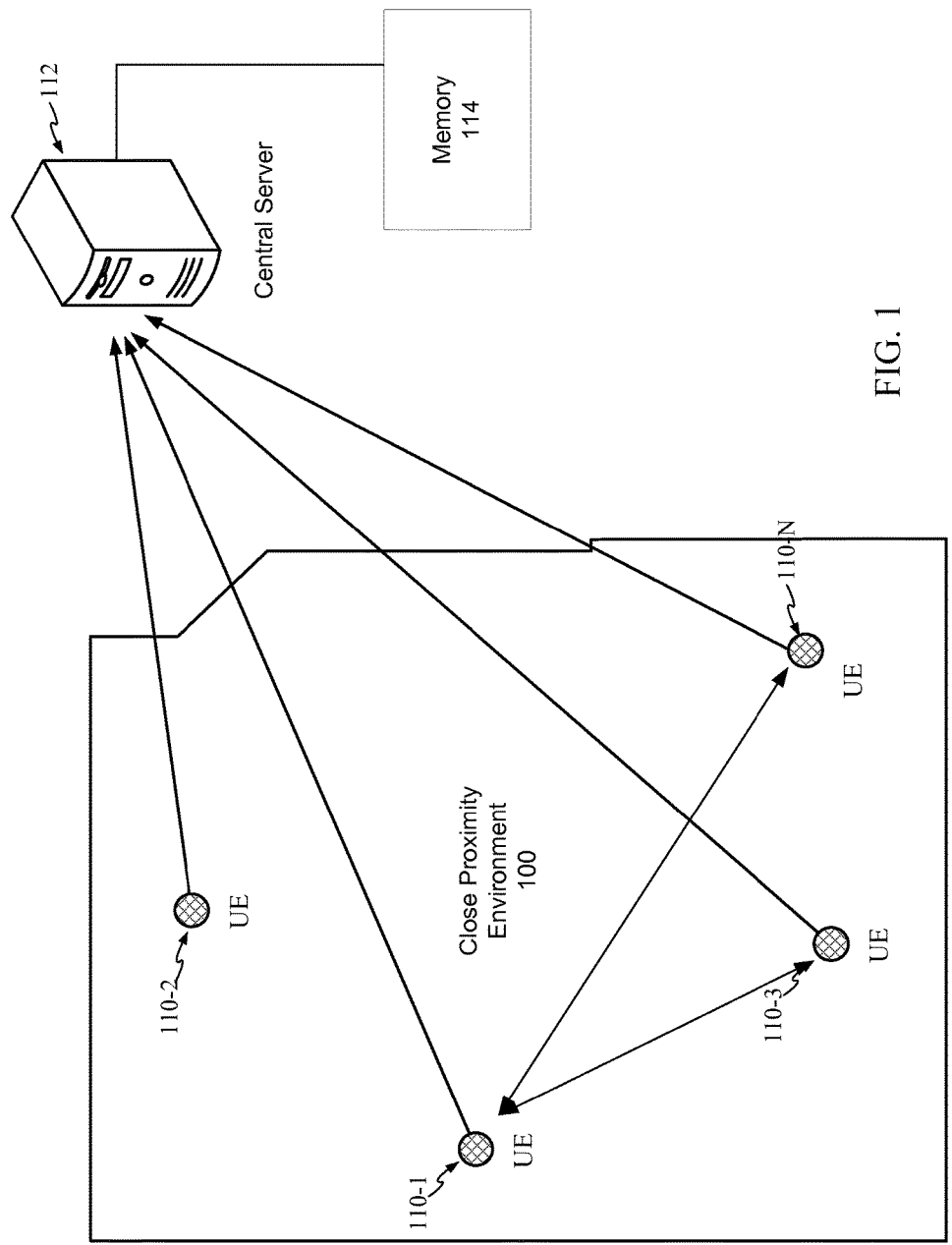
FIG. 1 shows a layout of a close proximity environment illustrating a group of users gathered together for an event according to some aspects of the disclosure.

FIG. 1 shows a layout of a close proximity environment 100 illustrating a group of users gathered together for an event according to one aspect of the disclosure. The close proximity environment 100 may be a conference room, a vehicle, a classroom, a club, a bar, or the like. Each user may have a user equipment (UE) 110 (110-1, . . . , 110-N) configured to transmit and receive location signals of the surrounding or neighboring user equipment 110. For example, a target user equipment 110-1 may run a background process that reports signals such as the location and other sensor (e.g. accelerometer) data or information to other user equipment 110-3 and 110-N, and/or to a central server 112. The server 112 can harness this data from the users and others close by for providing information to the user equipment 110 based on a social context or activity in which the users are engaged.

In some aspects of the disclosure, the relative position of a UE 110 is determined based on triangulation of a user's position according to a Bluetooth implementation, a WLAN implementation, a WiFi direct implementation, Near Field Communications (NFC) implementation, an ultrasound implementation, or any other implementation that is capable of providing location information of a user equipment 110-1 in relation to other user equipment 110. Each user equipment 110 may be equipped with a transceiver for transmitting and receiving signals to/from the server 112 and the other user equipment 110. In some aspects of the disclosure, the transceiver can be an ultrasound, Bluetooth, WiFi transceiver and/or any other like transceiver. The relative locations of the user equipment 110 may be determined based on an amplitude of a signal received at the transceiver of the respective user equipment 110. In general, the user equipment 110 that are further away from the target user equipment 110-1 may have a weaker signal than those that are closer to the target user equipment 110-1.

In some aspects of the disclosure, the target user equipment 110-1, in response to receiving the signals from its neighboring user equipment 110, may determine a pattern of the users. The determination of the pattern may be based on the relative signal strengths and/or locations of the neighboring user equipment 110. The target user equipment 110-1 can determine a social context or an activity based on the determined pattern. In response to determining the social context, the user equipment 110 can receive or generate information associated with the determined social context or activity. The user equipment 110 may include a storage device or memory to store one or more patterns associated with the different social contexts. The stored patterns can determine a future social context or an activity of the user.

In some aspects of the disclosure, each user equipment 110 may communicate their location information to a central server 112. The location information communicated by each user equipment 110 may be relative to the location of the neighboring user equipment 110. The relative location of a user equipment 110 may be based on a detected signal from one or more user equipment 110. For example, the user equipment 110 may detect the signal and forward information associated with the detected signal to the server 112. The information may indicate that one or more of the user equipments 110 are moving away from or toward one another.

In one aspect of the disclosure, the central server 112 may access signal strength information of one or more user equipments 110 relative to other user equipment 110 within a same vicinity. In one aspect of the disclosure, the detection at the central server is based on the information received from the user equipment 110. In other aspects of the disclosure, the user equipment 110 may detect signal strength information of one or more user equipments 110 relative to other user equipment 110 and forward the signal strength information to the central server 112. Based on the location information, the central server 112 can detect a pattern of the users of the user equipments 110. The central server 112 can then determine a social context or an activity of the users based on the detected pattern. One aspect of the disclosure dynamically tracks changes in user equipment patterns and derives a social context based on the detected changes in user equipment patterns.

As shown in FIG. 1, the server 112 may include a storage device, memory or database 114 to store one or more predetermined patterns associated with one or more social contexts. In one configuration, the storage device 114 is independent, but coupled to the server 112. In some aspects of the disclosure, the server 112 is remotely located, and the user equipment 110 can transmit to and receive information from the server 112 via a wired and/or wireless network.

By having a database of predetermined patterns associated with different social context activities, the determination of a future social context or an activity of the user can be improved. For example, the server 112 can compare current information received from one or more user equipment 110 against the information in the database or the storage device 114. The result of the comparison may determine a current social context. For example, if the current pattern associated with the target user equipment 110-1 relative to other user equipment 110-2 to 110-N is similar to an existing pattern in the database, the user of the target user equipment 110-1 may be engaged in a social activity similar to that of the existing pattern. In one configuration, the result of the comparison may prompt the server 112 to update an existing social context associated with a pattern in the storage device 114.

In some aspects of the disclosure, a user of the target user equipment 110-1 may provide the server 112 with the social activity in which the user is engaged as social activity information. When the user provides the social activity information, the server 112 may use that information to improve or optimize its pattern detection capability. For example, in conjunction with the social activity information received, the server 112 may also obtain location information of the target user equipment 110-1 relative to other user equipment 110-2 110-N. Based on the location information, the server 112 can detect a pattern and determine a current social context of the target user equipment 110-1. The determined current social context may be compared to the social context or the activity provided by the user, and the result is used to improve or optimize the pattern detection capability of the server 112. For example, some parameters for detecting the pattern and the social context can be adjusted to improve the correspondence between the social context information provided by the user and the social context determined by the server 112.

FIGS. 2A-2E illustrate sample patterns of user equipment 210 (210-1, . . . , 210-N) representing a group of users gathered together for an event according to some aspects of the disclosure. As described above with reference to FIG. 1, the server 112 may be configured to recognize patterns based upon the information or data received from the user equipment 210. For example, if the user equipment 210 are in a substantially circular arrangement 200 and are stationary, as illustrated in FIG. 2A, the server 112 may deduce that the users are in a conference room and that a meeting is taking place. In this configuration, the server 112 may suggest or automatically switch ringers to vibrate mode, for example. When a member of a group meeting moves to the head of the table, indicating that he/she becomes the meeting moderator, control of a shared application being projected on a screen may be transferred to that user, and the application (e.g., Microsoft Live Meeting) may be reconfigured accordingly.

When the user equipment 210 are in a substantially linear arrangement 202, as illustrated in FIG. 2B, the server 112 may deduce that the users are waiting in line for an event. The server 112 can compute a length of the line, and provide information about, for example, an average wait times at the store or theaters, or other like establishment. When the information received by the server 112 suggests that the users are in several lines and stationary, the server 112 may deduce that the users are in a lecture hall or a movie theater. In one configuration, the information received by the server 112 may indicate that a user of a user equipment 210 is standing while other users may be sitting. In one aspect of the disclosure, an accelerometer may be implemented in the user equipment 110 to detect whether a user is sitting, walking, running, standing etc. This information may be based on information generated by an accelerometer associated with the user equipment 210. In this case, the server 112 may deduce that the user that is standing is presenting to the other users who are sitting.

In some aspects of the disclosure, the information received by the server 112 from the user equipment 210 may indicate that several users are within a close proximity and moving without an organized pattern. In this case, the server 112 may deduce that a social gathering or party with loud noise may be occurring. In response, the server may generate, provide, or activate an application for illustrating or demonstrating events that occurred at the party. For example, an animation application may be launched to illustrate an event that occurred at the social gathering.

In some aspects of the disclosure, the information received by the server may indicate that all of the user equipment 210 are arranged in a substantially rectangular shaped configuration 204 and are traveling at the same speed, as illustrated in FIG. 2C. In this situation, the server 112 may deduce that the users are traveling in a moving vehicle. The driver's user equipment 210-1 may be identified out of the group based on the relative position of the user equipment 210 and other information received from the user equipment 210-2, 210-3, and 210-4. As a result, an incoming text messages may be routed to a passenger's phone. Further, "road trip" applications on all the user equipment 210 in the traveling group may become more prominent in their operating system menus.

In some aspects of the disclosure, a group dispersal pattern 206, as illustrated in FIG. 2D, or a group gathering pattern 208, as illustrated in FIG. 2E, may be detected by the server 112. The detection may be based on information received by the server 112 indicating that the user equipment 210 are moving away from or toward one another. In the case where the user equipments 210 move away, the server 112 may deduce that a meeting, event, or activity has ended. The server may then automatically generate messages to others who might be on their way to the event. Conversely the spontaneous formation of a group, as illustrated in FIG. 2D may result in the server 112 generating a message to others who subscribe to a given activity.

The detection of patterns described with reference to FIGS. 2A to 2E, by leveraging the location of those around a user, provides the user with improved communication system and/or network interaction.

Figure 3:
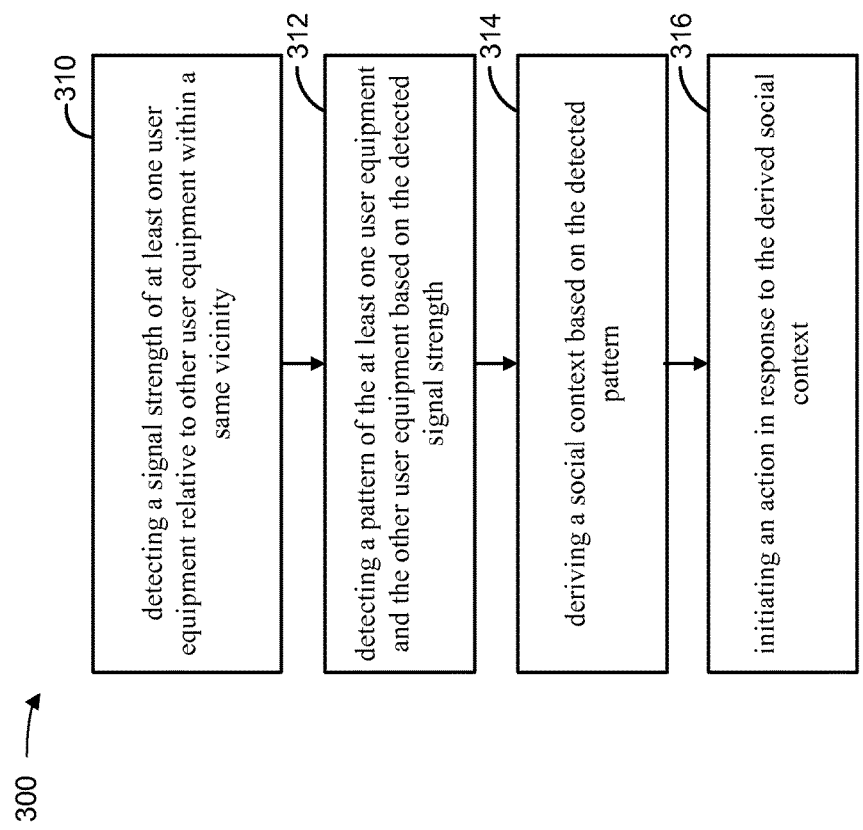
FIG. 3 is a block diagram illustrating a server based contextual awareness method or process for communicating in a wireless network.

FIG. 3 is a block diagram illustrating a server based contextual awareness method 300 for communicating in a wireless network. The method includes detecting a signal strength of one or more user equipments (UEs) relative to other user equipment within a same vicinity at block 310. For example, as shown in FIG. 1, the central server 112 may detect signal strength information of one or more user equipments 110 relative to other user equipment 110 within a same vicinity based on information received from the user equipment 110. At block 312, a pattern of the user equipment(s) and the other user equipment is detected based on the detected signal strength of the user equipment(s) relative to the other user equipment. For example, as shown in FIG. 1, based on the location information, the central server 112 can detect a pattern of the users of the user equipment 110. At block 314, the method includes deriving a social context based on the detected pattern. For example, as shown in FIG. 1, the central server 112 can determine a social context or an activity of the users based on the detected pattern. At block 316, the method initiates an action in response to the derived social context. For example, as shown in FIG. 1, if the user equipment is operating in a classroom, the user equipment 110 (or a server 112 associated with the user equipment 110) may generate information to suggest switching the user equipment 110 to a vibrate mode.

Although the location or positions of the users may be determined as described above, the locations can also be determined by other position determination systems (PDS). In one aspect of the disclosure, the positions or locations of the participants can be determined as described above and/or by PDS in the user equipment or mobile communication device, such as cell phones carried by the participants. The PDS may include any number of ground and satellite-based positioning systems. For example, PDSs may include but are not limited to satellite positioning systems (SPSs) and Global Navigation Satellite Systems (GNSS), such as Global Positioning System (GPS), Galileo, Glonass, and BeiDou and the like. A PDS can also include any ground based position determination system or indoor location system, as noted above.

Figure 4:
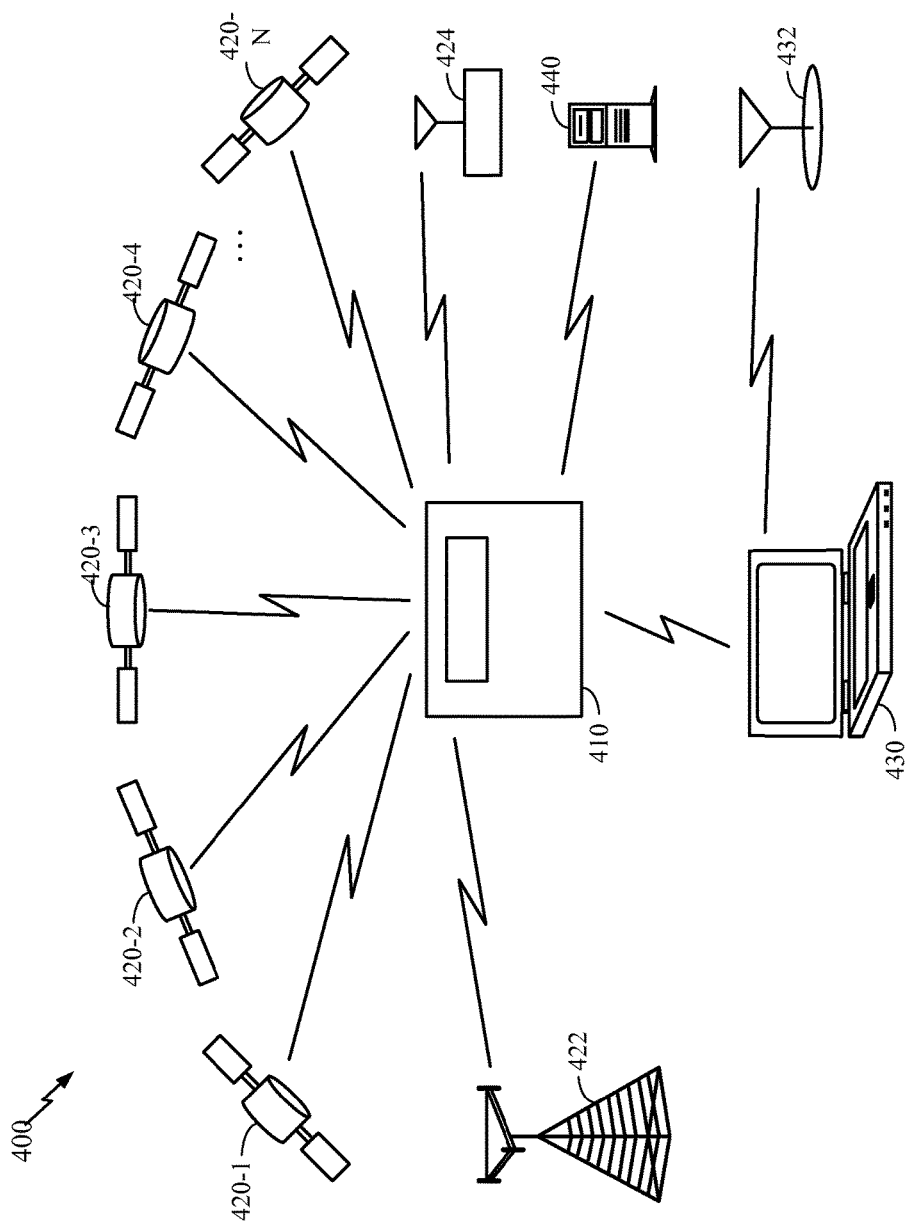
FIG. 4 shows a block diagram of a satellite positioning system (SPS) system according to some aspects of the disclosure.

FIG. 4 shows a block diagram of an SPS system 400 according to one aspect of the present disclosure. As shown in FIG. 4, the SPS system 400 includes various satellites. Representatively, satellites 420 (420-1, . . . , 420-N), are shown as a part of the SPS system 400. Some of the satellites 420, however, may actually belong to additional systems. The satellites 420 may be used together, as a part of the SPS 400, for various purposes.

A user equipment or mobile device 410 is configured to acquire, receive, and process the signals from the satellites 420, which may be from an SPS, such as a GPS, Galileo, GLONASS, GNSS, a system that uses satellites from a combination of these systems, or any SPS developed in the future. In this aspect of the present disclosure, an SPS/PDS positioning process begins with the mobile device 410 searching for location data from alternative sources, such as a cell site 422, a laptop computer 430, a desktop computer 440, the wireless transmitter 432 via the laptop computer 430, and a wireless transmitter 424. The transmitter 424 could include any number of various transmitters, such as a BLUETOOTH™ transmitter, an 802.11x wireless access point, a femtocell, a transponder device, a digital television (DTV) transmitter, a commercial radio transmitter (e.g., FM or AM radio), and the like. In some cases, the location data is converted to an actual location. In other cases, the location data itself, rather than the actual location is processed by the mobile device 410. For example, a time difference of arrival (TDOA) between two cell sites measurement may be received and used as the location data by the mobile device 410.

The mobile device 410 can establish communication with the cell site 422 in either a uni-directional or bi-directional communication. The mobile device 410 and the cell site 422 may provide various forms of location data, such as a mobile country code (MCC), and a cell identifier (ID). In this configuration, the MCC and/or ID enable a lookup of the cell location in a base station almanac, latitude, longitude, and altitude. In this configuration, the latitude, longitude, and altitude of the cell may be used as a seed location or combined with the location from other transceivers, as well as timing and/or signal strength information, to calculate a seed location of the mobile device 410. In a uni-directional communication, the mobile device 410 receives at least the cell ID. During a bi-directional communication, the mobile device 410 receives at least the MCC and the cell site ID. The information received during the bi-directional communication is more reliable because the identities of the mobile device 410, the cell site 422, and the network that operates over the cell site 422 are verified. In this case, the location of the base stations and transceivers may be verified for accuracy via the bi-directional communication.

The methodologies described herein may be implemented by various techniques depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes computer readable storage media. A computer readable storage medium may be any available medium that can be store information and can be accessed by a computer (and does not refer to a transitory propagating signal). By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable storage media.

In addition to storage on computer readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 5:
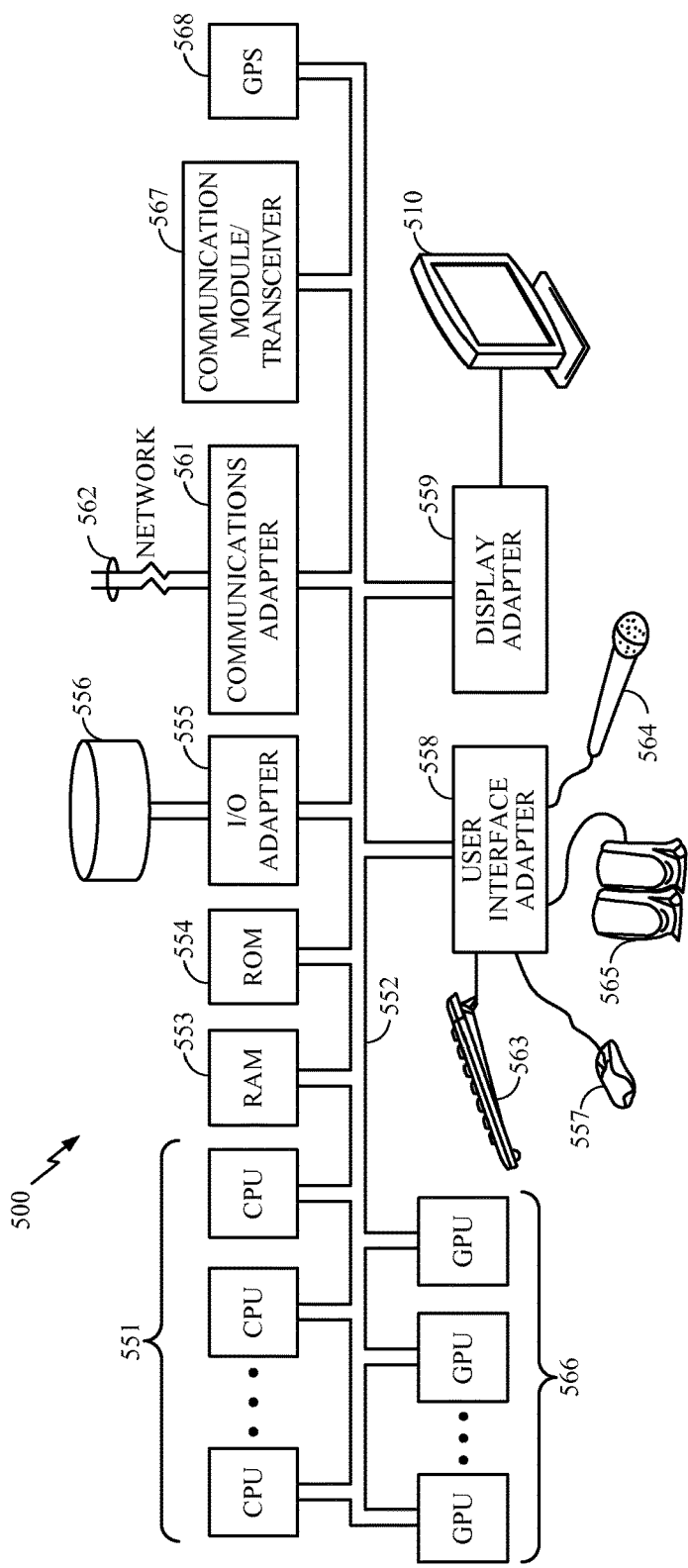
FIG. 5 illustrates an exemplary computer system, which may be employed to implement the central server according to some aspects of the disclosure.

FIG. 5 illustrates a computer system 500, which may be employed to implement the central server 112 and/or UE 110, 210 according to certain aspects of the present disclosure. A central processing unit ("CPU" or "processor") 551 is coupled to a system bus 552. The CPU 551 may be any general-purpose processor. The present disclosure is not restricted by the architecture of the CPU 551 (or other components of the exemplary system 500) as long as the CPU 551 (and other components of the system 500) supports the operations as described herein. As such, the CPU 551 may provide processing to the system 500 through one or more processors or processor cores. The CPU 551 may execute the various logical instructions described herein. For example, the CPU 551 may execute machine-level instructions according to the exemplary operational flow described above in conjunction with FIG. 3. When executing instructions representative of the operational blocks illustrated in FIG. 3, the CPU 551 becomes a special-purpose processor of a special purpose computing platform configured specifically to operate according to the various aspects of the teachings described herein.

The computer system 500 also includes random access memory (RAM) 553, which may be SRAM, DRAM, SDRAM, or the like. The computer system 500 includes read-only memory (ROM) 554 which may be PROM, EPROM, EEPROM, or the like. The RAM 553 and ROM 554 hold user and system data and programs, as is well known in the art.

The computer system 500 also includes an input/output (I/O) adapter 555, communications adapter 561, user interface adapter 558, and display adapter 559. The I/O adapter 555, user interface adapter 558, and/or communications adapter 561 may, in certain aspects of the disclosure, enable a user to interact with the computer system 500 to input information. A communication module/transceiver 567 provides radio frequency communication capabilities to the computer system 500. A SPS receiver 568 provides satellite-enabled positioning information to be obtained in various satellite positioning systems.

The I/O adapter 555 couples a storage device(s) 556, such as one or more of a hard drive, compact disc (CD) drive, floppy disk drive, tape drive, SD card, etc., to the computer system 500. The storage devices are utilized in addition to the RAM 553 for the memory associated with performing the operations associated with the SPS receivers and context awareness processing configured according to various aspects of the present teachings. The communications adapter 561 is adapted to couple the computer system 500 to the network 562, which may enable information to be input to and/or output from the system 500 via the network 562 (e.g., the Internet or other wide-area network, a local-area network, a public or private switched telephony network, a wireless network, any combination of the foregoing). A user interface adapter 558 couples user input devices, such as a keyboard 563, a pointing device 557, a touch screen (not depicted) and a microphone 564 and/or output devices, such as speaker(s) 565 to the computer system 500. A display adapter 559 is driven by the processor 551 or by a graphical processing unit (GPU) 566 to control the display on a display device 560, for example, to display the context aware resulting applications. A GPU 566 may be any of a various number of processors dedicated to graphics processing and, as illustrated, may be made up of one or more individual graphical processors. A GPU 566 processes the graphical instructions and transmits those instructions to a display adapter 559. The display adapter 559 further transmits those instructions for transforming or manipulating the state of the various numbers of pixels used by the display device 560 to visually present the desired information to a user. Such instructions include instructions for changing state from on to off, setting a particular color, intensity, duration, or the like. Each such instruction makes up the rendering instructions that control how and what is displayed on the display device 510.

Figure 6:
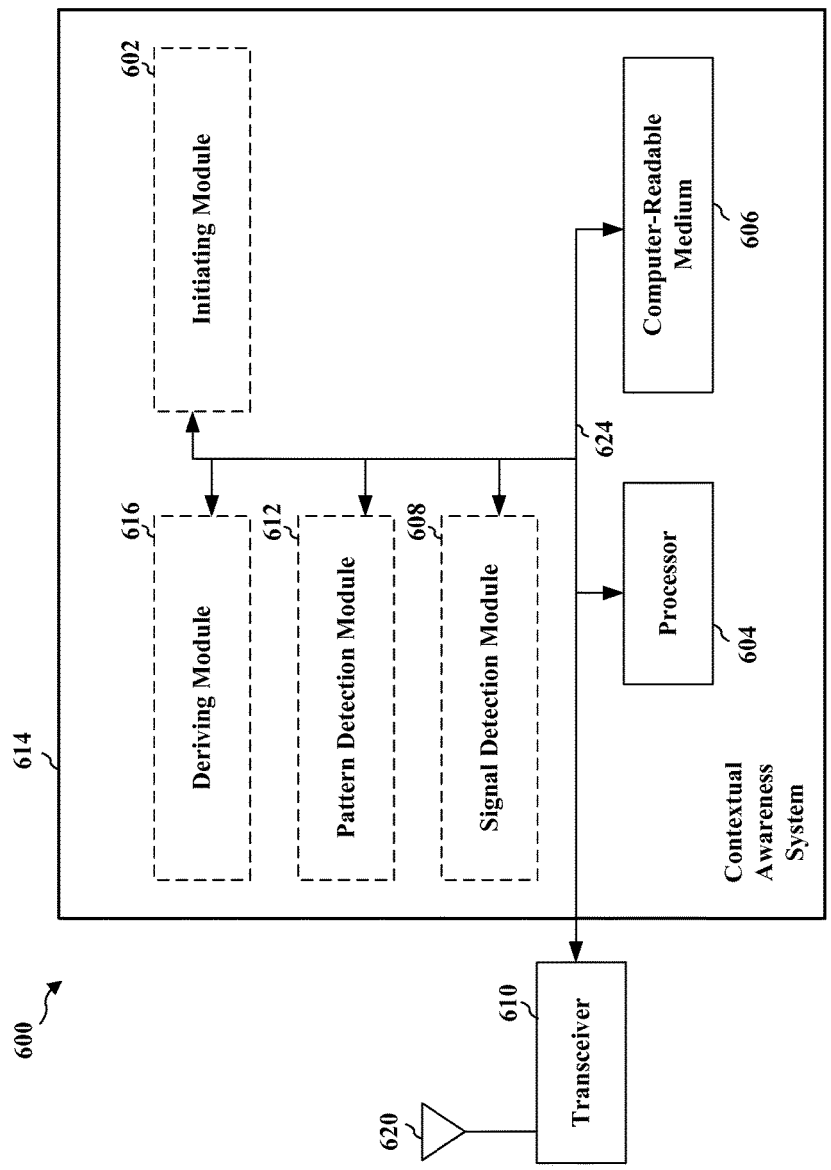
FIG. 6 is a diagram illustrating an example of a hardware implementation for an apparatus employing a contextual awareness processing system.

FIG. 6 is a diagram illustrating an example of a hardware implementation for an apparatus 600 employing a contextual awareness system 614. The contextual awareness system 614 may be implemented with a bus architecture, represented generally by a bus 624. The bus 624 may include any number of interconnecting buses and bridges depending on the specific application of the contextual awareness system 614 and the overall design constraints. The bus 624 links together various circuits including one or more processors and/or hardware modules, represented by a processor 604, a signal detection module 608, a pattern detection module 612, a deriving module 616 and an initiating module 602, and a computer-readable storage medium 606. The bus 624 may also link various other circuits such as timing sources, peripherals, voltage regulators, and power management circuits, which are well known in the art, and therefore, will not be described any further.

The apparatus 600 includes the contextual awareness system 614 coupled to a transceiver 610. The transceiver 610 is coupled to one or more antennas 620. The transceiver 610 provides a means for communicating with various other apparatus over a transmission medium. The contextual awareness system 614 includes the processor 604 coupled to the computer-readable storage medium 606. The processor 604 is responsible for general processing, including the execution of software stored on the computer-readable storage medium 606. The software, when executed by the processor 604, causes the contextual awareness system 614 to perform the various functions described supra for any particular apparatus. The computer-readable storage medium 606 may also be used for storing data that is manipulated by the processor 604 when executing software. The contextual awareness system 614 further includes the signal detection module 608, the pattern detection module 612, the deriving module 616 and the initiating module 602. The signal detection module 608, the pattern detection module 612, the deriving module 616 and the initiating module 602 may be software modules running in the processor 604, resident/stored in the computer readable storage medium 606, one or more hardware modules coupled to the processor 604, or some combination thereof The contextual awareness system 614 may be a component of the central server 112 and may include the memory 114.

In one configuration, the apparatus 600 for wireless communication includes means for detecting a signal strength of one or more user equipments relative to other user equipment within a same vicinity. The signal strength detecting means may be the signal detection module 608, the central server 112, the user equipment 110, 210 and/or the contextual awareness system 614 of the apparatus 600 configured to perform the functions recited by the signal strength detecting means. In a system in which apparatus 600 doesn't directly detect the signal strength, it detects the signal strength by accessing received information indicative of signal strength. In another aspect, the aforementioned means may be any module or any apparatus configured to perform the functions recited by the aforementioned means.

In one configuration, the apparatus 600 for wireless communication includes means for detecting a pattern of the one or more user equipments and the other user equipment based on the detected signal strength of the one or more user equipments relative to the other user equipment. The pattern detecting means may be the pattern detection module 612, the central server 112, the user equipment 110, 210 and/or the contextual awareness system 614 of the apparatus 600 configured to perform the functions recited by the pattern detecting means. In another aspect, the aforementioned means may be any module or any apparatus configured to perform the functions recited by the aforementioned means.

In one configuration, the apparatus 600 for wireless communication includes means for deriving a social context based on the detected pattern. The deriving means may be the deriving module 616, the central server 112, the user equipment 110, 210 and/or the contextual awareness system 614 of the apparatus 600 configured to perform the functions recited by the deriving means. In another aspect, the aforementioned means may be any module or any apparatus configured to perform the functions recited by the aforementioned means.

In one configuration, the apparatus 600 for wireless communication includes means for initiating an action in response to the derived social context. The initiating means may be the initiating module 602, the central server 112, the user equipment 110, 210 and/or the contextual awareness system 614 of the apparatus 600 configured to perform the functions recited by the initiating means. In another aspect, the aforementioned means may be any module or any apparatus configured to perform the functions recited by the aforementioned means.

Apparatus 600 may be implemented in a number of ways. For example, apparatus 600 may be a mobile device such as a UE 110 or one or more network resources such as central server 112. The components of apparatus 600 may be implemented in a single device, or at least some functionality may be performed by more than one device. Although apparatus 600 shows discrete modules for ease of illustration, as noted above some or all of the functionality may be performed by different module(s). For example, where a module may be implemented using memory and processing resources, the functionality attributed to a particular module in FIG. 6 may in some implementations be performed entirely using processor 604 and computer readable storage medium 606.

Signal detection module 608 may be implemented in a combination of hardware and software. For example, signal detection module 608 may include one or more antennas and/or antenna interfaces to receive signals from other mobile devices in the vicinity. The signal detection module may also include a processor (e.g., processor 604 may perform some functionality of signal detection module 608) to determine signal strength(s) for at least one additional mobile device. Locations of the other mobile devices in the vicinity may be determined, although in some implementations patterns can be detected using signal strength information (and perhaps additional information), without explicitly determining a location of the other mobile devices. The signal strength information can then be used to detect a pattern using pattern detection module 612.

Pattern detection module 612 may detect a pattern using location and/or signal strength information. As with signal detection module 608, pattern detection module 612 may be at least partially implemented using processor 604 and computer-readable storage medium 606. For example, instructions to detect patterns may be stored in computer-readable storage medium 606, as well as pattern information associated with one or more particular contexts. Processor 604 may execute the instructions and cause results of the pattern detection to be stored in computer readable storage medium 606.

Deriving module 616 may derive a social context using the information from pattern detection module 612. For example, received signal information and/or position information may be compared to one or more stored patterns to determine similarity between the detected and stored pattern. If the detected pattern corresponds to the stored pattern, the social context may be derived as a social context associated with the stored pattern.

As noted above, additional information may be used to derive social context. For example, information from one or more sensors can be used to classify a motion state and/or position state of the mobile device. If the detected pattern corresponds to a conference room, and a motion state of the user corresponds to standing, the derivation module may determine that the user of the mobile device is the speaker in the conference room. In a similar example, if information from the mobile phone microphone is used to determine a state of the user, correlation of an audio signal with the user's voice can be used to derive the social context of the user. If the user alone is speaking, the social context may again be derived as being in a conference room and speaking, whereas if the mobile device detects a single speaker that is not the user, the social context may be derived as being in a conference room as part of an audience. If multiple voices are speaking, the social context may be determined as being in a conference room and participating in a discussion.

After the social context is derived, an action may be initiated using initiating module 602, based on the derived context. If apparatus 600 is a mobile device, the action may be initiated and performed at the mobile device. If apparatus 600 is a network resource, the action may in some cases be initiated by transmitting control information to one or more mobile devices.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer readable storage medium known in the art. An exemplary computer readable storage medium is coupled to the processor such that the processor can read information from, and write information to, the computer readable storage medium. In the alternative, the computer readable storage medium may be integral to the processor. The processor and the computer readable storage medium may reside in an ASIC. The ASIC may reside in a user terminal In the alternative, the processor and the computer readable storage medium may reside as discrete components in a user terminal.

In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer readable storage media and communication media including any medium that facilitates transfer of a computer program from one place to another. A computer readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The phrases "storage media," "computer readable storage media," and similar phrases do not refer to transitory propagating signals.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but are to be accorded the widest scope consistent with the principles and novel features disclosed herein.

What is claimed is:

1. A contextual awareness method comprising:
    accessing, using a receiver coupled to an antenna, signal strength information of signals received by at least one user equipment from other user equipment within a same vicinity, wherein the at least one user equipment is a mobile device;
    determining a location of the at least one user equipment relative to at least two other user equipment based on the signal strength information;
    determining a user equipment pattern of the at least one user equipment and the at least two other user equipment based on the determined location of the at least one user equipment relative to the at least two other user equipment;
    deriving a social context based on the determined user equipment pattern by comparing the determined user equipment pattern with predetermined patterns associated with different social contexts; and
    initiating an action of the at least one user equipment in response to the derived social context.

2. The method of claim 1, further comprising:
    dynamically tracking changes in the user equipment pattern; and
    deriving the social context based on the tracked changes in the user equipment pattern.

3. The method of claim 1, in which deriving the social context comprises one of determining a driver of a vehicle, determining a speaker of a meeting, and determining a teacher in a classroom.

4. The method of claim 1, in which accessing signal strength information comprises accessing information indicative of signal strength for at least one signal type selected from the group consisting of Bluetooth signal, a Wireless Local Area Network (WLAN) signal, and an ultrasound signal.

5. The method of claim 1, in which initiating the action further comprises one of:
    initiating a process to switch the at least one user equipment to a vibrate mode,
    initiating transfer of control of a shared application,
    computing a length of a queue and determining information about an average wait time of the queue,
    initiating launch of an application on the at least one user equipment, and
    routing incoming text messages to passengers of a vehicle.

6. An apparatus comprising:
    a memory; and
    at least one processor coupled to the memory and configured:
        to access, using a receiver coupled to an antenna, signal strength information of signals received by at least one user equipment from other user equipment within a same vicinity, wherein the at least one user equipment is a mobile device,
        to determine a location of the at least one user equipment relative to at least two other user equipment based on the signal strength information,
        to determine a user equipment pattern of the at least one user equipment and the at least two other user equipment based on the determined location of the at least one user equipment relative to the at least two other user equipment,
        to derive a social context based on the determined user equipment pattern by comparing the determined user equipment pattern with predetermined patterns associated with different social contexts, and
        to initiate an activity of the at least one user equipment in response to the derived social context.

7. The apparatus of claim 6, in which the at least one processor is further configured:
    to dynamically track changes in the detected user equipment pattern; and to derive the social context based on the tracked changes in the user equipment pattern.

8. The apparatus of claim 6, in which the at least one processor is further configured to derive the social context by one of:
   determining a driver of a vehicle, determining a speaker of a meeting, and determining a teacher in a classroom.

9. The apparatus of claim 6, in which the accessing the signal strength information comprises accessing information indicative of one or more signal strength types selected from the group consisting of:
   Bluetooth signal strength, Wireless Local Area Network (WLAN) signal strength, and ultrasound signal strength.

10. The apparatus of claim 6, in which the at least one processor is further configured to initiate the activity by one of:
   initiating a process to switch the at least one user equipment to a vibrate mode,
   initiating transfer of control of a shared application,
   computing a length of a queue and determining information about an average wait time of the queue,
   initiating launch of an application on the at least one user equipment, and
   routing incoming text messages to passengers of a vehicle.

11. A computer program product for wireless communications in a wireless network, comprising:
   a non-transitory computer-readable storage medium having program code recorded thereon, the program code comprising:
      program code to access, using a receiver coupled to an antenna, signal strength information of signals received by at least one user equipment from other user equipment within a same vicinity, wherein the at least one user equipment is a mobile device,
      program code to determine a location of the at least one user equipment relative to at least two other user equipment based on the accessed signal strength information,
      program code to determine a user equipment pattern of the at least one user equipment and the at least two other user equipment based on the determined location of the at least one user equipment relative to the at least two other user equipment,
      program code to derive a social context based on the determined user equipment pattern by comparing the determined user equipment pattern with predetermined patterns associated with different social contexts, and
      program code to initiate an activity of the at least one user equipment in response to the derived social context.

12. The computer program product of claim 11, further comprising:
   program code to dynamically track changes in the user equipment pattern; and
   program code to derive the social context based on the tracked changes in the user equipment pattern.

13. The computer program product of claim 11, in which the program code to derive the social context further comprises one or more program code types selected from the group consisting of:
   program code to determine a driver of a vehicle, program code to determine a speaker of a meeting, and program code to determine a teacher in a classroom.

14. The computer program product of claim 11, in which the program code to access signal strength information comprises program code to store one or more signal strength information types selected from the group consisting of:
   Bluetooth signal strength information, Wireless Local Area Network (WLAN) signal strength, and ultrasound signal strength.

15. The computer program product of claim 11, in which the program code to initiate the activity further comprises one of:
   program code to initiate a process to switch the at least one user equipment to a vibrate mode,
   program code to initiate transfer of control of a shared application,
   program code to compute a length of a queue and determine information about an average wait time of the queue,
   program code to initiate launch of an application on the at least one user equipment, and
   program code to route incoming text messages to passengers of a vehicle.

* * * * *